(12) United States Patent
Harley

(10) Patent No.: US 8,381,436 B2
(45) Date of Patent: Feb. 26, 2013

(54) SELF WATERING SYSTEM

(76) Inventor: J. Robert Harley, Apollo Beach, FL (US)

( * ) Notice: Subject to any disclaimer, the term of this patent is extended or adjusted under 35 U.S.C. 154(b) by 116 days.

(21) Appl. No.: 12/803,183

(22) Filed: Jun. 21, 2010

(65) Prior Publication Data

US 2011/0308152 A1    Dec. 22, 2011

(51) Int. Cl.
*A01G 13/00* (2006.01)
(52) U.S. Cl. .............................. 47/48.5; 47/30; 47/33
(58) Field of Classification Search ............. 47/48.5, 47/30, 33; *A01G 13/00*
See application file for complete search history.

(56) References Cited

U.S. PATENT DOCUMENTS

| | | | | |
|---|---|---|---|---|
| 135,173 | A * | 1/1873 | Timby | 47/30 |
| 757,045 | A * | 4/1904 | Lane | 47/31.1 |
| 2,822,644 | A * | 2/1958 | Berger | 47/32 |
| 3,005,287 | A * | 10/1961 | Dudley | 47/21.1 |
| 4,145,841 | A * | 3/1979 | Woolpert | 47/66.1 |
| 4,268,992 | A * | 5/1981 | Scharf, Sr. | 47/32.4 |
| 5,094,033 | A * | 3/1992 | Drew | 47/69 |
| 5,323,557 | A * | 6/1994 | Sonntag | 47/32 |
| 6,484,439 | B1 * | 11/2002 | Tonkin et al. | 47/48.5 |
| 6,976,334 | B1 * | 12/2005 | Bowditch | 47/32 |
| D555,440 | S * | 11/2007 | Murray | D8/1 |

* cited by examiner

*Primary Examiner* — Francis T. Palo
*Assistant Examiner* — Joshua Huson
(74) *Attorney, Agent, or Firm* — Arthur W. Fisher, III

(57) ABSTRACT

A self watering system to water the roots of the vegetation with condensate from ground moisture collected within a condensate enclosure comprising an outer substantially vertical peripheral wall, an inner substantially vertical wall and an upper wall having at least two substantially flat sections inclined relative to each other and intersecting the upper portion of the outer substantially vertical wall and the upper portion of the inner substantially vertical wall at different angles each of less than ninety degrees to cooperatively form the condensate enclosure to collect moisture from the ground on the inner surface of the substantially flat sections to allow the moisture to condense into droplets to provide water to roots of the vegetation within the condensate enclosure.

7 Claims, 8 Drawing Sheets

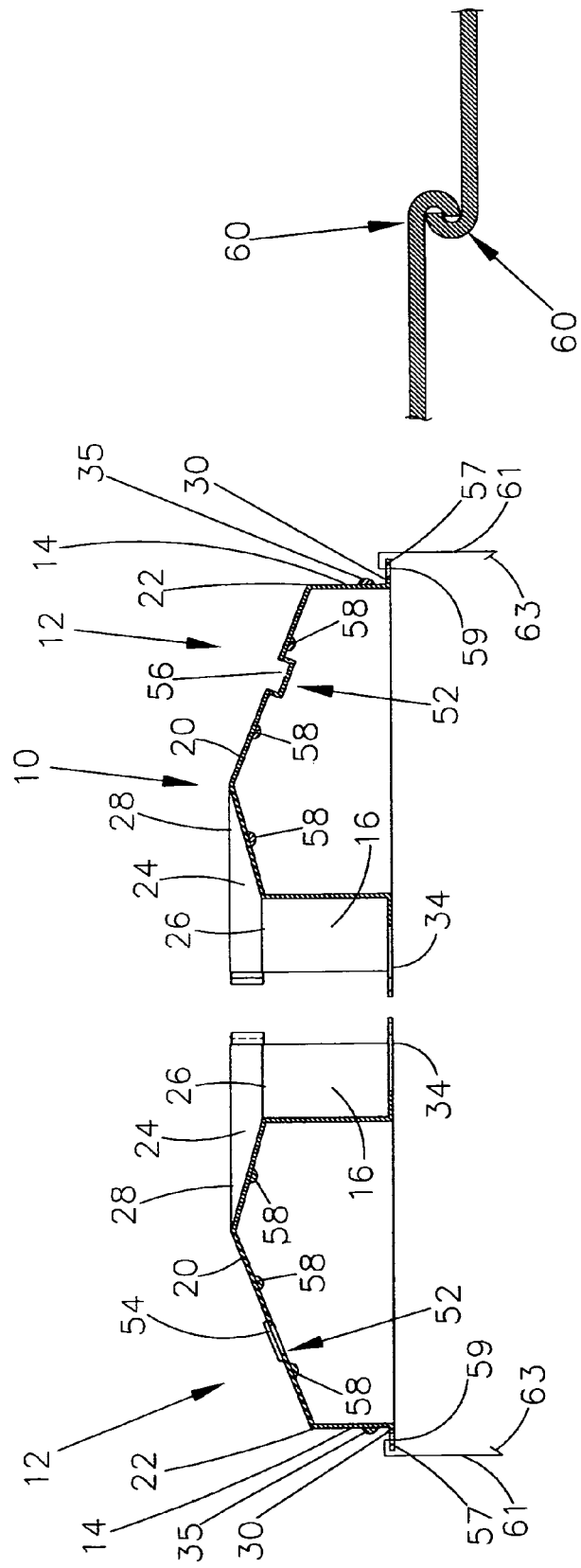

US 8,381,436 B2

SELF WATERING SYSTEM

BACKGROUND OF THE INVENTION

1. Field of the Invention

A self watering system comprising a condensate enclosure to water the roots of the vegetation with water condensed on the interior surface of the condensate enclosure.

2. Description of the Prior Art

Various systems have been developed using the principle of a solar still to condense and collect water. This principle has been specifically applied to agriculture use. Several examples are reported below.

U.S. Pat. No. 4,286,408 relates to a planter for seed planting comprising means for condensation and direction of the condensed water onto a limited area where the seeds are planted in a fertilized mulch.

U.S. Pat. No. 3,611,633 shows a planting receptacle comprising at least one soil containing peripheral wall portion merging with a bottom wall portion, a plurality of hollow anchor tubes extending downwardly from the bottom wall portion for anchoring the receptacle to the earth including hollow interiors in open communication with the interior of the receptacle and a plurality of tube wall apertures in each of the anchor tubes for permitting root growth from the receptacle into the earth.

U.S. Pat. No. 3,461,606 teaches a device for conserving soil moisture and nutrients for direct feeding to the roots of plants, vines and trees comprising a shield positioned as a cover for and spaced from the wall of a hole in a soil surface, a receptacle for water and other nutrients buried below the shield and spaced therefrom. The shield includes a conical central portion with a vertex at the bottom with means securing the vertex of the shield to the covering wall adjacent the opening therein so as to position the vertex directly above second aperture in the receptacle whereby condensation on the underside of the shield will trickle into the receptacle to continuously replenish the supply of liquid therein.

U.S. Pat. No. 3,436,313 describes a survival device for use for travelers in arid regions to obtain potable water from soil, plant materials and contaminated water. A sheet is disposed in a pit forming a cone with its apex. A receptacle is placed at the base of the pit under the apex. Sunlight passing through the sheet vaporizing moisture in the soil or plant material which condenses on the sloping surface of the conical sheet and flows to the apex thereof and drops into the receptacle.

Additional examples of the prior art are found in U.S. Pat. Nos. 1,930,939 and 3,337,418.

SUMMARY OF THE INVENTION

The present invention relates to a self watering system comprising a condensate enclosure including a pair of shells configured to cooperatively form the condensate enclosure to water the roots of the vegetation with condensate from ground moisture.

Each shell comprises an outer arcuate wall, an inner wall including an inner arcuate wall section having an inner straight wall section extending outwardly from each end portion thereof to intersect a corresponding end portion of the outer arcuate wall and an upper inclined wall to cooperatively from a condensate chamber therebetween.

The two shells are placed in the ground in surrounding relationship to a plant or tree extending upwardly through a central opening or aperture cooperatively formed by the two shells such that each shell forms a compartment or condensate chamber to trap the ground moisture rising to the upper inclined wall. The shells collect the condensate on the inside surfaces of the upper wall due to the "solar still" effect that feeds the root ball below.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIG. 4 is an exploded cross-sectional side view of an alternate embodiment of the self watering system of the present invention depicting the cycle of watering vegetation partially disposed therein.

FIG. 5 is a detailed cross-sectional side view of the interlocking elements of the alternate embodiment of the self watering system of the present invention.

Similar reference characters refer to similar parts throughout the several views of the drawings.

DETAILED DESCRIPTION OF THE PREFERRED EMBODIMENT

Figure 1:
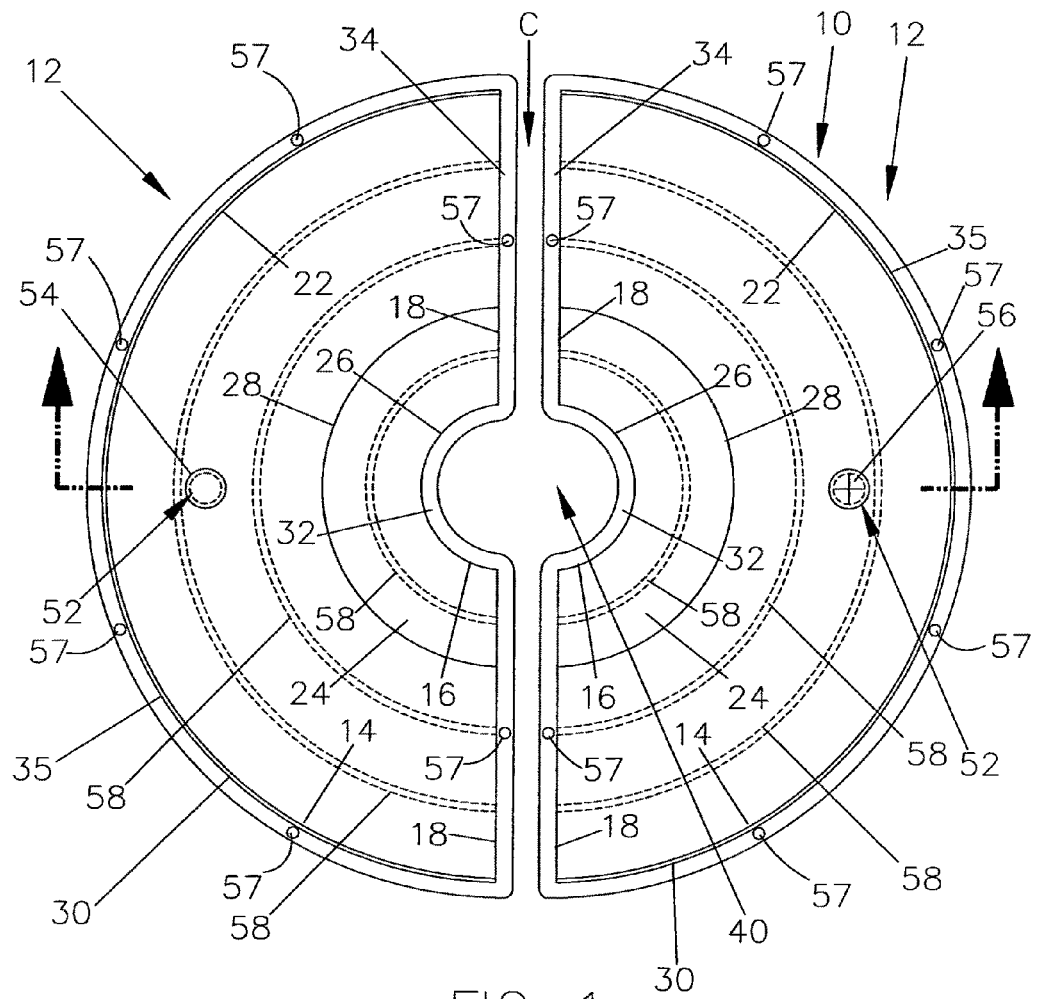
FIG. 1 is a top view of the self watering system of the present invention.
Figure 2:
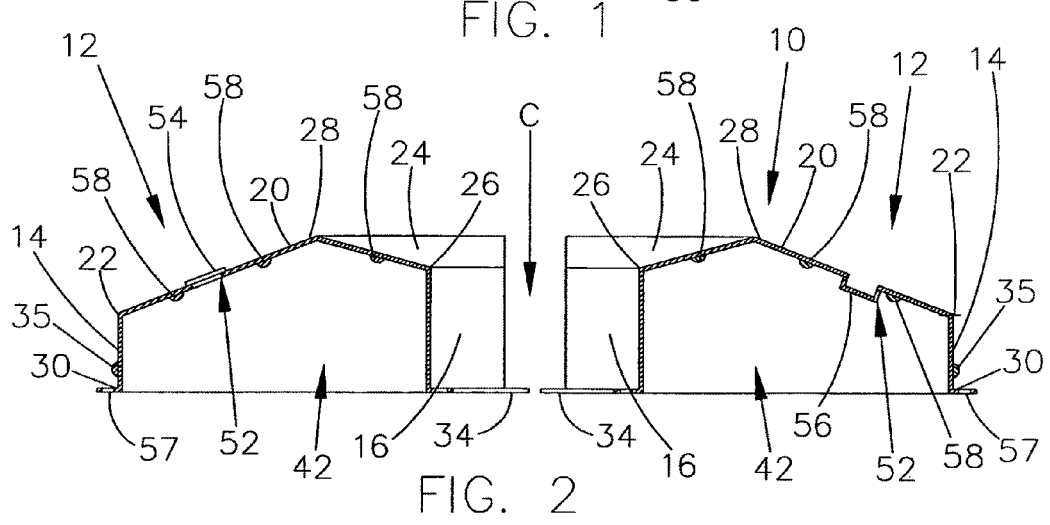
FIG. 2 is a cross-sectional side view of the self watering system of the present invention.
Figure 3:
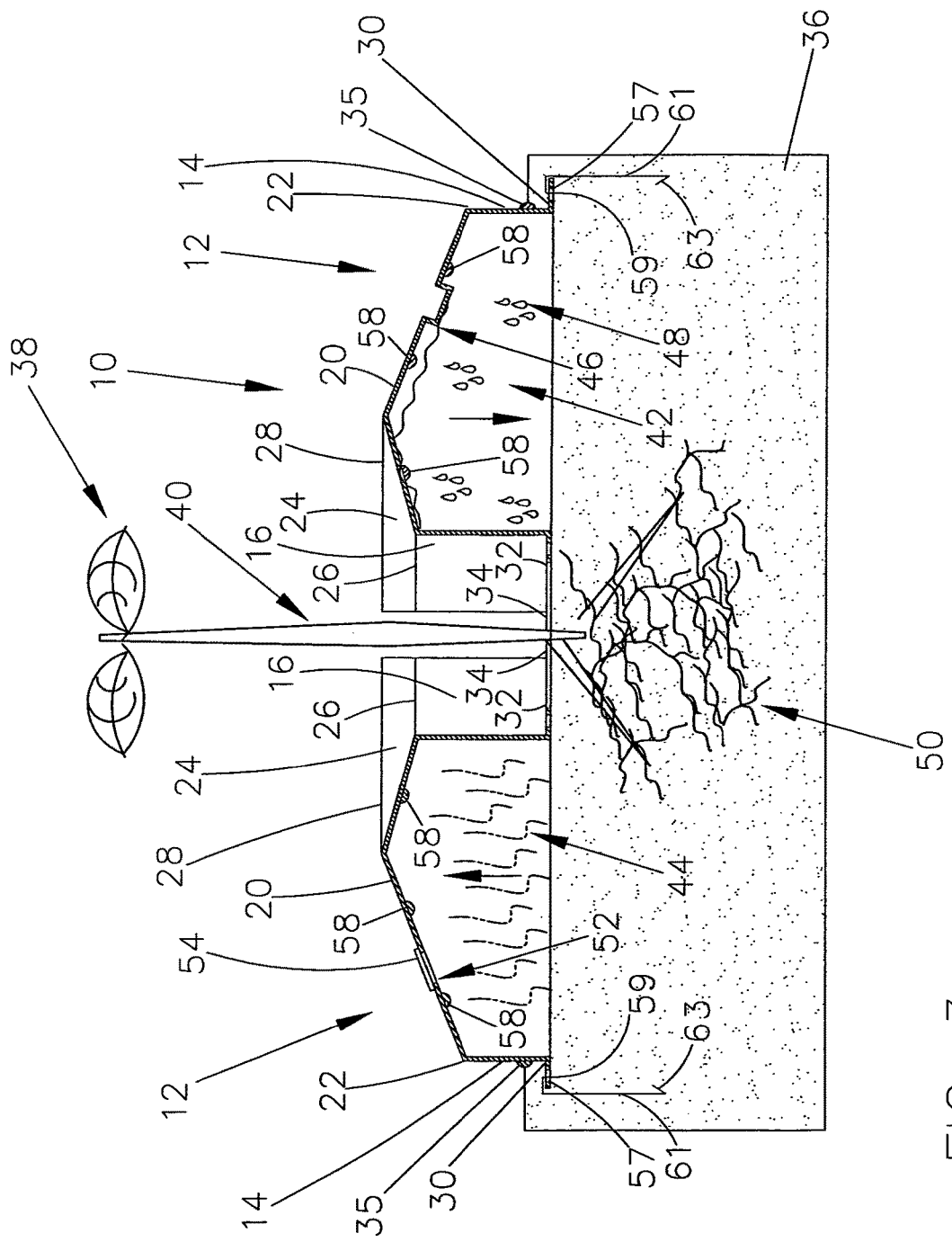
FIG. 3 is a cross-sectional side view of the self watering system of the present invention depicting the cycle of watering vegetation partially disposed therein.

As shown in FIG. 1 through 3, the present invention relates to a self watering system generally indicated as 10 to water the roots of the vegetation with condensate from ground moisture.

The condensate enclosure 10 comprises a pair of substantially hemispherical shaped shells each generally indicated as 12 disposed in spaced relationship relative to each other to cooperatively form a channel C to allow rain to reach the surface of the ground 36 adjacent a plant or tree 38.

As best shown in FIGS. 2 and 3, each shell 12 comprises an outer substantially vertical semi-circular or arcuate peripheral wall 14, an inner substantially vertical wall including an inner semi-circular or arcuate wall section 16 having a substantially flat inner wall section 18 extending outwardly from each end portion thereof to intersect a corresponding end portion of the outer substantially vertical semi-circular or arcuate peripheral wall 14, and an upper wall including an outer substantially flat upper wall section 20 inclined inwardly from the upper portion of the outer substantially vertical semi-circular or arcuate peripheral wall 14 forming an obtuse angle 22 therebetween and an inner substantially flat upper wall section 24 inclined inwardly from the upper portion of the inner substantially vertical wall forming an obtuse angle 26 therebetween to intersect the outer substantially flat upper wall section 20 to form an obtuse angle 28 therebetween to cooperatively form a condensate chamber or compartment 42 therebetween.

A flange comprising a substantially semi-circular or arcuate outer flange portion 30 and an inner flange portion including a substantially semi-circular or arcuate inner flange section 32 having a substantially straight inner flange section 34 extending outwardly from each end portion thereof to intersect a corresponding end portion of the substantially semi-circular or arcuate outer flange portion 30 extend outwardly from the lower portions of the outer substantially vertical semi-circular or arcuate peripheral wall 14 and the inner substantially vertical flat wall 18 respectively.

An indicia or bead or protrusion 35 or other marker such as a strip or color or indentation may be formed on the outer substantially vertical semi-circular or arcuate peripheral wall 14 as a means to indicate the depth to which each pair of shells 12 is buried or placed in the ground 36.

The angles 22, 26 and 28 range from about 110 degrees to about 120 degrees, from about 110 degrees to about 120 degrees, and from about 110 degrees to about 135 degrees respectively.

As shown in FIG. 3, the two shells 12 are placed in the ground 36 in surrounding relationship to a plant or tree generally indicated as 38 extending upwardly through a central opening or aperture 40 such that each shell 12 forms a condensate chamber or compartment 42 to trap the ground moisture 44 rising to the outer substantially flat inclined upper section 20 and the inner substantially flat inclined upper wall 24 of the upper wall.

The shells 12 collect the moisture 44 to form condensate 46 that forms droplets 48 on the inside surfaces of the outer substantially flat upper wall section 20 and inner substantially flat upper wall section 24 due to the "solar still" effect that feed the root ball 50 below. An access port or aperture 52 normally closed by a corresponding stopper 54 allows the application of fertilizers and other chemical additives without removal of the shells 12 from the planting bed. Alternatively, a membrane 56 may be secured within the access port or aperture 52 to permit access to the interior of the condensate chamber or compartment 42.

Continuous concentric beads or protrusions 58 may extend downward from the inner surface of the outer substantially flat upper wall section 20 and the inner substantially flat upper wall section 24 into the condsensate chamber of compartment 42 to contact the condensate 46 on the inner surface of the outer substantially flat upper wall section 20 and the inner substantially flat upper wall section 24 creating droplets 48 throughout the upper surfaces of condensate chamber or compartment 42.

A hydro-phobic coating may be added to the inner surface of the outer substantially flat inclined upper wall section 20 and the inner substantially flat inclined upper wall section 24 to facilitate in the migration of the droplets 48 to the continuous concentric beads or protrusions 58 and to the outer substantially vertical semi-circular or arcuate peripheral wall 14 where the condensate is 46 is directed into the soil or ground 36 at the outer limits of the planting area by virtue of the enclosure geometry. A smaller amount of condensate is directed to the inner semi-circular or arcuate wall section 16 and the substantially flat inner wall section 18 around the base of the plant or tree 38. This condensation process occurs continuously, but is generally most effective in the evening and early morning.

Figure 10:
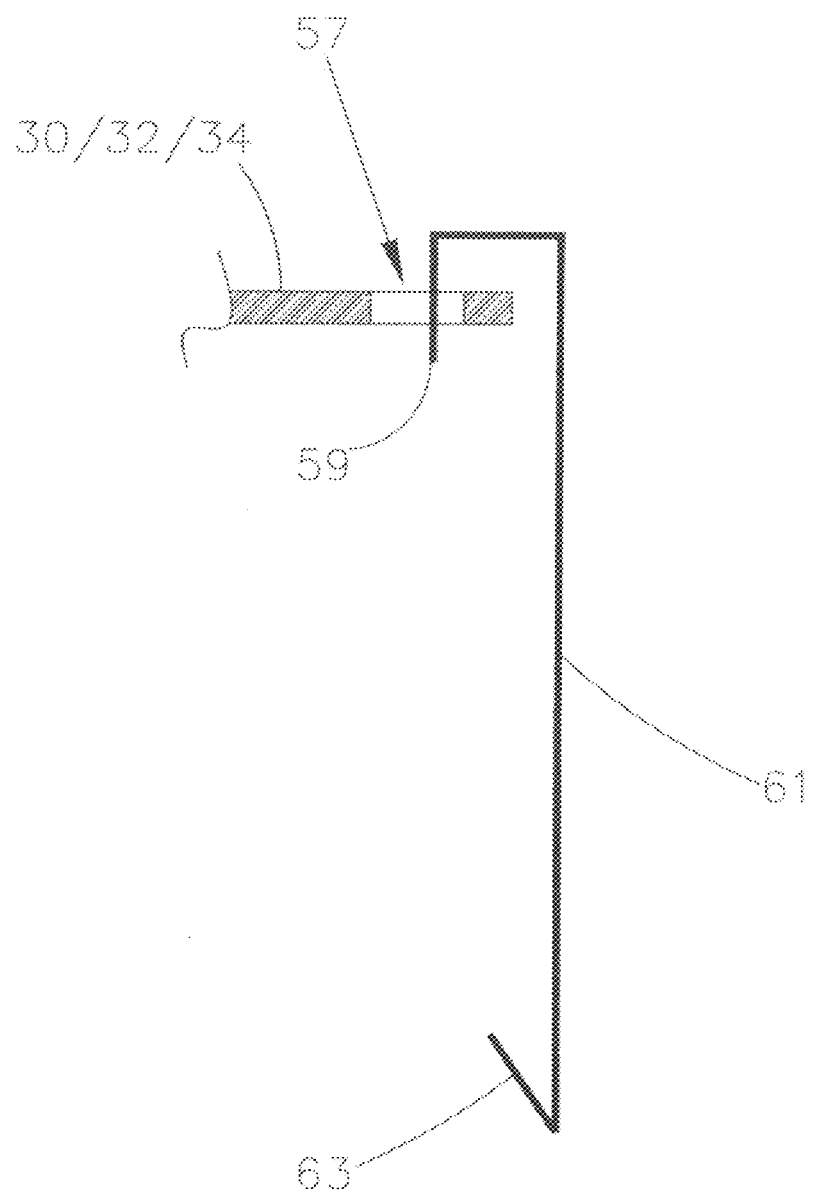
FIG. 10 is a detailed view of the anchor to secure the condensate enclosure of the self watering system of the present invention in place.

As shown in FIGS. 1 through 3 and detailed in FIG. 10, the substantially semi-circular or arcuate outer flange portion 30 and the inner flange portion including the substantially semi-circular or arcuate inner flange section 32 having the substantially straight inner flange section 34 include at least one aperture 57 to receive the curved portion 59 of a substantially J-shaped anchor 61 having a pointed end portion 63 to secure the shells 12 in the ground 36.

FIG. 4 shows an alternate embodiment of the self water system 10 when the inner substantially vertical wall of each shell 12 is eliminated such that the shells 12 when placed around the plant or tree 38 and interlock by a pair of overlapping or interlocking elements or members 60 cooperatively form a single condensate chamber or compartment 42.

Figure 6:
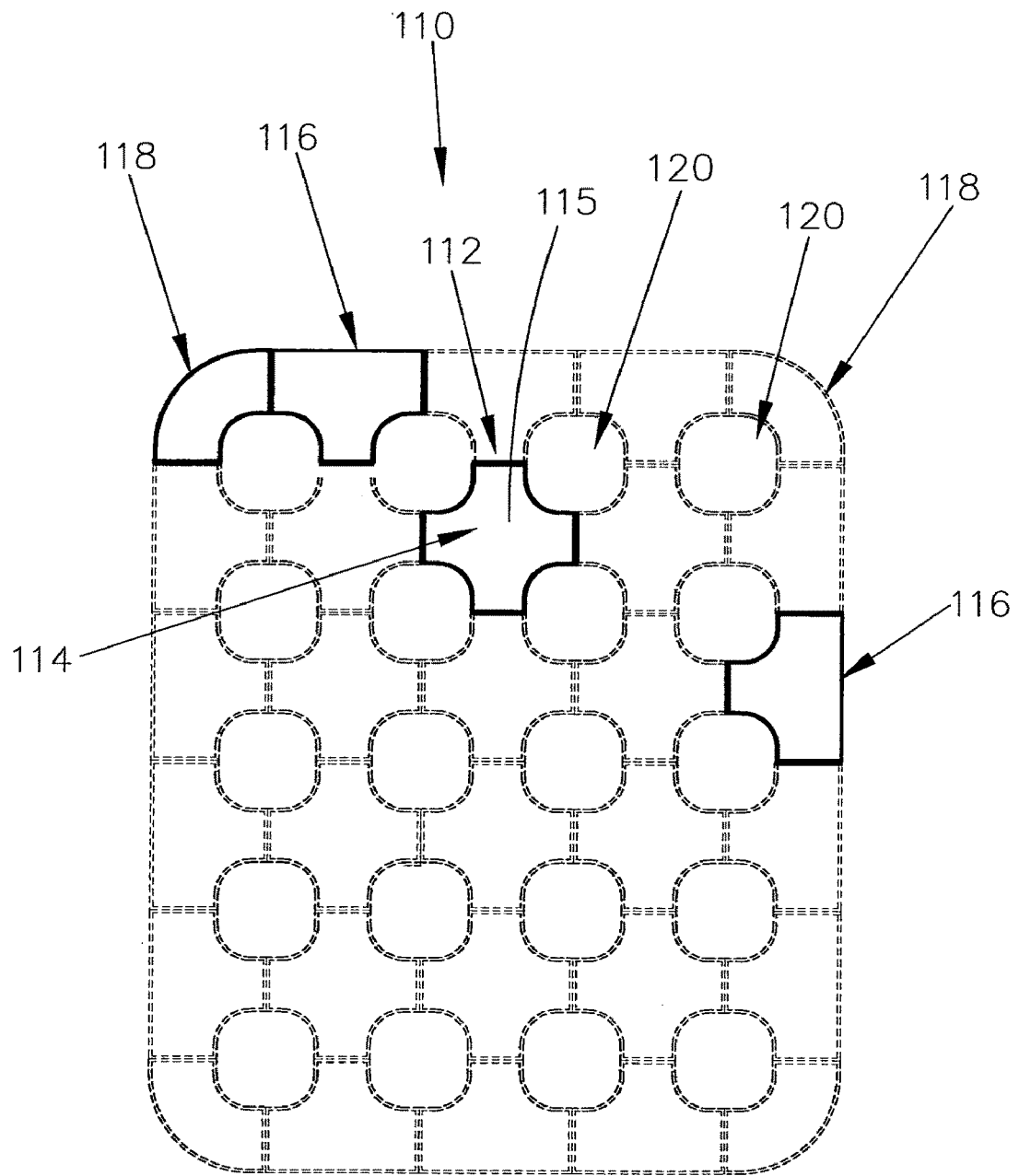
FIG. 6 is a top view of another alternate embodiment of the self watering system of the present invention.

By varying the configuration of the shells 12, field/bed plantings, row plantings, and individual trees or shrubs can be accommodated. For example, as shown in FIG. 6, the self watering system 110 comprises a plurality of substantially X shaped interior shells each generally indicated as 112 including four legs or extensions each indicated as 114 extending outwardly from the center 115, a plurality of substantially T shaped peripheral shells each generally indicated as 116 and a plurality of arcuate or substantially U shaped corner shells each generally indicated as 118 to cooperatively form a plurality of plant or tree openings each indicated as 120 to receive a plant or tree 38.

Alternately, the peripheral shells may comprise a substantially T shaped peripheral shell 116 and at least one arcuate or substantially U shaped shell 118 formed together as a unitary or single peripheral shell.

Figure 7:
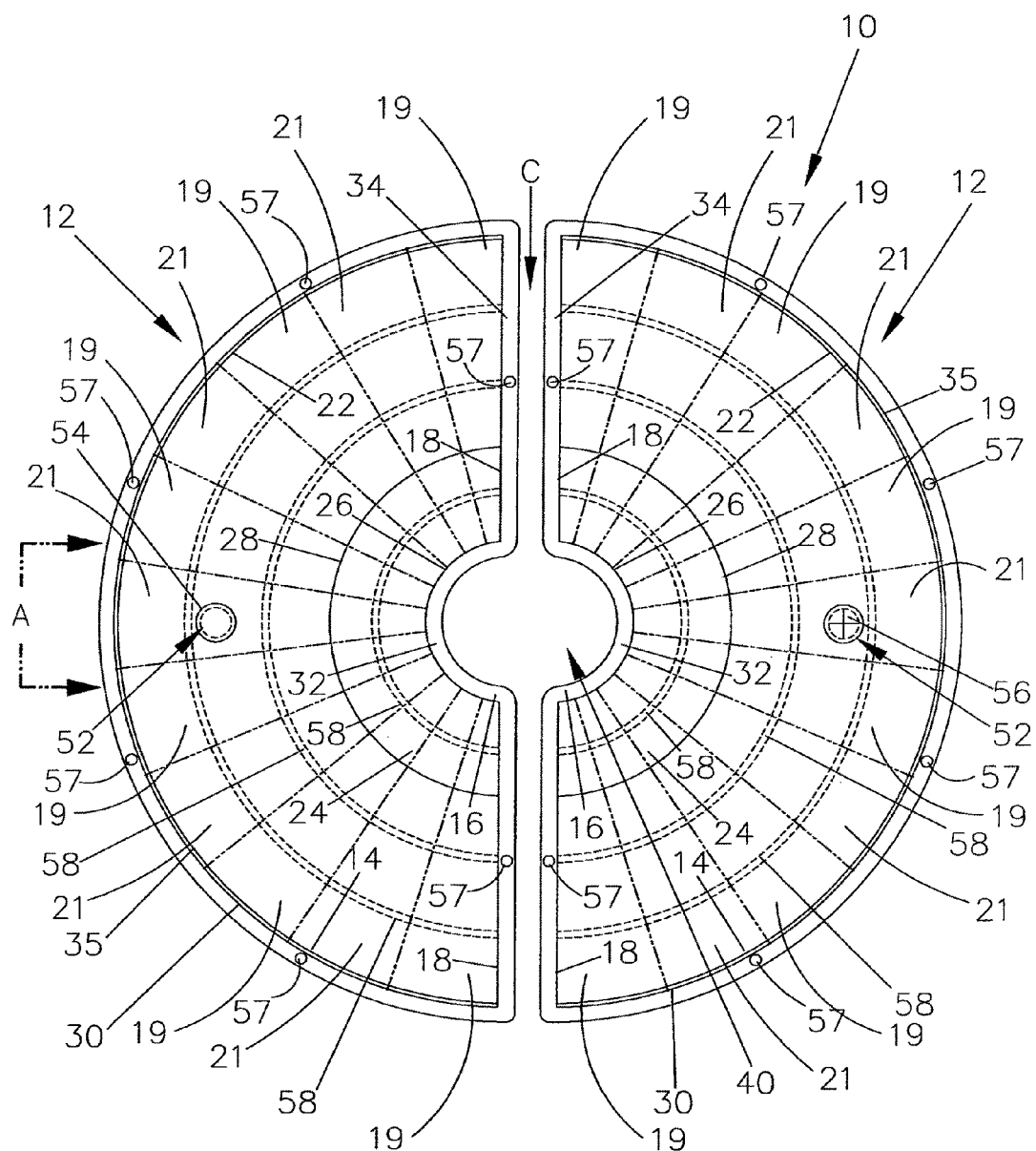
FIG. 7 is a top view of still another alternate embodiment of the self watering system of the present invention.
Figure 8:
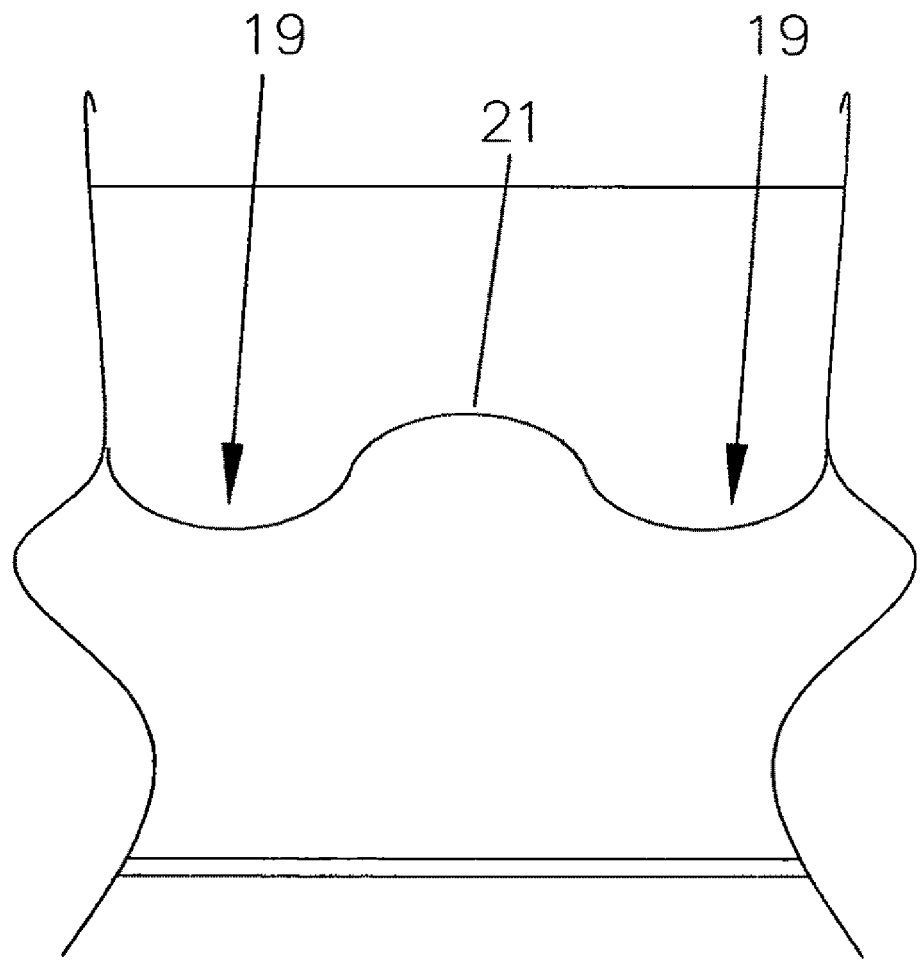
FIG. 8 is a partial end view of the alternate embodiment of the self watering system of the present invention shown in FIG. 7.

FIGS. 7 and 8 depict another alternate embodiment of the self watering system 10 with similar structural elements similarly designated as the embodiment shown in FIGS. 1 through 3. Specifically, each shell 12 comprises an outer substantially vertical semi-circular or arcuate peripheral wall 14, an inner substantially vertical wall including an inner semi-circular or arcuate wall section 16 having a substantially flat inner wall section 18 extending outwardly from each end portion thereof to intersect a corresponding end portion of the outer substantially vertical semi-circular or arcuate peripheral wall 14, and an upper wall including an outer substantially corrugated upper wall section 20 having a plurality of furrows and ridges each indicated as 19 and 21 respectively extending radially inward from the upper portion of the outer substantially vertical semi-circular or arcuate peripheral wall 14 forming an obtuse angle 22 therebetween and an inner substantially corrugated upper wall section having a corresponding plurality of furrows and ridges similarly indicated as 19 and 21 respectively extending radially inward from the upper portion of the inner substantially vertical wall forming an obtuse angle 26 therebetween to intersect the outer substantially flat upper wall section 20 to form an obtuse angle 28 therebetween to cooperatively form a condensate chamber or compartment 42 therebetween.

Figure 9:
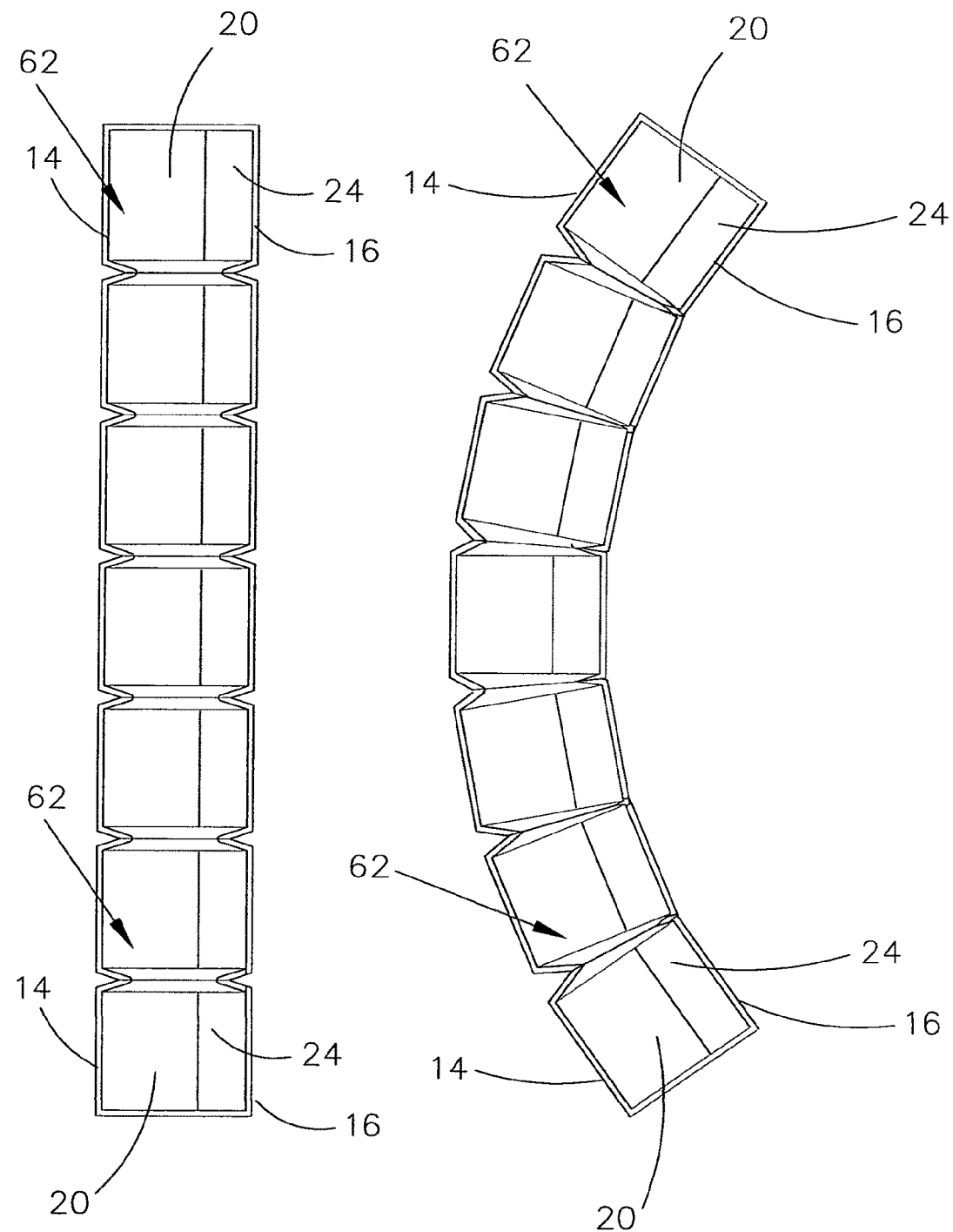
FIG. 9 is a top view of yet another alternate embodiment of the self watering system of the present invention.

FIG. 9 shows a plurality of shells 12 each coupled to adjacent shells 12 by a flexible connector 62 such that the plurality of interconnected shells 12 may be contured or bent to permit shaping the shells 12 around roots of the vegetation.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A self watering system to water the roots of a plant with condensate from ground moisture collected within a condensate enclosure, comprising:
    an outer peripheral wall comprising an outer substantially vertical semicircular or arcuate peripheral wall having an inner surface;
    an inner wall comprising an inner substantially vertical wall including a centrally located inner semicircular or arcuate inner wall section flanked on either side by a substantially flat inner wall section extending outwardly therefrom to intersect with a corresponding end portion of said outer substantially vertical semi-circular or arcuate peripheral wall;
    a substantially semicircular or arcuate upper wall comprising a first inner inclined upper wall section angularly intersecting the upper portion of said inner vertical wall and a second outer inclined upper wall section angularly intersecting the upper portion of said outer peripheral wall, wherein said first and second upper wall sections are inclined angularly relative to each other forming an apex junction at a point between said inner and outer walls,
    wherein said outer, inner, and upper walls form a closed shell condensate chamber to collect ground moisture evaporated from the ground within the enclosure in the form of condensation droplets that accumulate on an inner surface of said upper wall sections to direct condensate to fall adjacent the roots of said plant thereby recirculating water ground water within the shell enclosure creating a self watering plant system.

2. The self watering system of claim 1 further including a flange comprising a substantially semi-circular or arcuate outer flange portion and an inner flange portion including a substantially semi-circular or arcuate inner flange section having a substantially straight inner flange section extending outwardly from each end portion thereof to intersect a corresponding end portion of said substantially semi-circular or arcuate outer flange portion extending outwardly from the lower portions of said outer substantially vertical semi-circular or arcuate peripheral wall and said inner substantially vertical flat wall respectively.

3. The self watering system of claim 2 wherein said flange includes at least one aperture formed therethrough to receive an anchor to secure said condensate enclosure in place.

4. The self watering system of claim 1 wherein said upper wall includes an outer substantially flat upper wall section inclined inwardly from said upper portion of said outer substantially vertical semi-circular or arcuate peripheral wall forming an obtuse angle therebetween and an inner substantially flat upper wall section inclined inwardly from said upper portion of said inner substantially flat vertical wall forming an obtuse angle to intersect said outer substantially flat upper wall section to form an obtuse angle therebetween.

5. The self watering system of claim 4 wherein said obtuse angles range from about 110 degrees to about 120 degrees, from about 110 degrees to about 120 degrees, and from about 110 degrees to about 135 degrees respectively.

6. The self watering system of claim 1 wherein a hydrophobic coating is applied to said inner surface of said outer substantially flat upper wall section and said inner substantially flat upper wall section to aid in migrating condensate to said outer peripheral wall and said inner wall.

7. The self watering system of claim 1 wherein at least one normally closed aperture is formed in each said shell to allow the application of fertilizers and other chemical additives without removal of said condensate enclosures from the planting bed.

\* \* \* \* \*